(12) United States Patent
Sidler et al.

(10) Patent No.: US 10,357,900 B2
(45) Date of Patent: Jul. 23, 2019

(54) METHODS AND SYSTEMS REQUIRING LUBRICATION

(71) Applicant: Imerys Graphite & Carbon Switzerland SA, Bodio (CH)

(72) Inventors: Thomas L. Sidler, North Ridgeville, OH (US); Michael T. Judge, Oak Harbor, OH (US); Fabio Rota, Comano (CH); Fabrizio Corti, Sala Capriasca (CH); Hugues Jacquemin, Agra (CH); Davide Cattaneo, Arbedo (CH); Michael Spahr, Bellinzona (CH)

(73) Assignee: IMERYS GRAPHITE & CARBON SWITZERLAND SA, Bodio (CH)

( * ) Notice: Subject to any disclaimer, the term of this patent is extended or adjusted under 35 U.S.C. 154(b) by 0 days.

(21) Appl. No.: 15/510,405

(22) PCT Filed: Sep. 10, 2015

(86) PCT No.: PCT/US2015/049287
§ 371 (c)(1),
(2) Date: Mar. 10, 2017

(87) PCT Pub. No.: WO2016/040545
PCT Pub. Date: Mar. 17, 2016

(65) Prior Publication Data
US 2017/0297232 A1    Oct. 19, 2017

Related U.S. Application Data

(60) Provisional application No. 62/049,444, filed on Sep. 12, 2014.

(51) Int. Cl.
| | | |
|---|---|---|
| *B22C 3/00* | (2006.01) | |
| *B21D 37/18* | (2006.01) | |
| *B29C 33/60* | (2006.01) | |
| *C10M 125/00* | (2006.01) | |
| *C10M 125/02* | (2006.01) | |
| *C10M 173/02* | (2006.01) | |

(52) U.S. Cl.
CPC ............. *B29C 33/60* (2013.01); *B22C 3/00* (2013.01); *C10M 125/00* (2013.01); *C10M 125/02* (2013.01); *C10M 173/02* (2013.01); *B21D 37/18* (2013.01); *C10M 2201/041* (2013.01); *C10M 2201/061* (2013.01); *C10M 2201/066* (2013.01); *C10N 2240/401* (2013.01); *C10N 2240/402* (2013.01); *C10N 2240/404* (2013.01); *C10N 2240/405* (2013.01); *C10N 2250/12* (2013.01); *C10N 2250/121* (2013.01); *C10N 2250/18* (2013.01)

(58) Field of Classification Search
CPC ... B29C 33/60; C10M 125/02; C10M 125/00; C10M 173/02; C10M 2201/041; C10M 2201/061; C10M 2201/066; C10N 2240/401; C10N 2240/402; C10N 2240/404; C10N 2240/406; C10N 2250/12; C10N 2250/121; C10N 2250/18; B22C 3/00; C21D 37/18
See application file for complete search history.

(56) References Cited

U.S. PATENT DOCUMENTS

| | | | |
|---|---|---|---|
| 2,858,667 A | | 1/1959 | Bowles |
| 2,868,667 A | | 1/1959 | Bowles |
| 3,105,048 A | | 9/1963 | Bobrowsky |
| 3,881,048 A | * | 4/1975 | Bertrand .................. C10M 7/00 428/447 |
| 3,899,625 A | * | 8/1975 | Izumi ................... B21D 22/201 428/457 |
| 4,052,323 A | * | 10/1977 | Feneberger ........ C10M 169/044 508/118 |
| 4,221,185 A | | 9/1980 | Scholes et al. |
| 4,601,327 A | * | 7/1986 | Kaneko ................ B22D 11/047 164/440 |
| 4,800,027 A | | 1/1989 | BeVier et al. |
| 5,221,185 A | * | 6/1993 | Pla .......................... B64C 11/50 244/1 N |
| 5,865,052 A | | 2/1999 | Weinhold et al. |
| 2007/0131140 A1 | * | 6/2007 | Aoki ................... B22D 17/2007 106/38.22 |
| 2011/0088864 A1 | | 4/2011 | Shia |
| 2013/0206353 A1 | * | 8/2013 | Carli ..................... B22D 11/07 164/472 |

FOREIGN PATENT DOCUMENTS

| | | |
|---|---|---|
| DE | 102011104520 A1 | 12/2012 |
| GB | 1 464 203 | 2/1977 |
| GB | 1 464 203 A | 2/1977 |
| RU | 2136420 C1 | 9/1999 |
| WO | WO 96/14946 | 11/1994 |
| WO | WO 97/48783 A1 | 12/1997 |
| WO | WO 2012/098423 A1 | 7/2012 |

OTHER PUBLICATIONS

International Search Report and Written Opinion dated Feb. 3, 2016, in International PCT Application No. PCT/US2015/049287, filed Sep. 10, 2015.

* cited by examiner

*Primary Examiner* — James C Goloboy

(74) *Attorney, Agent, or Firm* — Finnegan, Henderson, Farabow, Garrett & Dunner LLP

(57) ABSTRACT

Methods and systems in which a shapable mass, which is processed according to the method or in the system, has a lubricant applied thereto. As it is processed in the system, the shapable mass having the lubricant applied thereto is used to transfer lubricant to a part or parts of the system.

27 Claims, No Drawings

METHODS AND SYSTEMS REQUIRING LUBRICATION

CLAIM FOR PRIORITY

This application is a U.S. national phase entry under 35 U.S.C. § 371 from PCT International Application No. PCT/US2015/049287, filed Sep. 10, 2015, which claims the benefit of priority of U.S. Provisional Patent Application No. 62/049,444, filed Sep. 12, 2014, to both of which this application claims the benefit of priority, and the entirety of the subject matter of both of which is incorporated herein by reference.

TECHNICAL FIELD

The present invention is directed to methods and systems in which a shapable mass, which is processed according to the method or in the system, has a lubricant applied thereto. As it is processed in the system, the shapable mass having the lubricant applied thereto is used to transfer lubricant to a part or parts of the system.

BACKGROUND OF THE INVENTION

Articles of commerce may be manufactured, for example, by molding, in systems and apparatus requiring lubrication. There is an ongoing need for new and improved methods and systems and lubricants for lubricating systems in which an article of commerce is manufactured from a shapable precursor.

SUMMARY OF THE INVENTION

According to a first aspect, the present invention is directed to a method for improving the efficiency of a system requiring lubrication, the method comprising applying a lubricating dispersion including a solid lubricant to a shapable mass which is to be processed in the system, such that or whereby the efficiency of the system is improved.

According to a second aspect, the present invention is directed to a method of reducing waste in a system requiring lubrication, the method comprising applying a lubricating dispersion including a solid lubricant to a shapable mass which is to be processed in the system, such that or whereby waste is reduced.

According to a third aspect, the present invention is directed to a method of increasing the utilization rate of shaping means in a system for shaping a shapable mass, said method comprising applying a lubricating dispersion including a solid lubricant to the shapable mass prior to shaping the shapable mass in the shaping means.

According to a fourth aspect, the present invention is directed to a method of reducing the amount of lubricant used in a system requiring lubrication, said method comprising applying a lubricant dispersion to a shapable mass to be processed in the system such that lubricant is transferred from the shapable mass to a part of parts of the system requiring lubrication, thereby reducing the amount of lubricant used in the system.

According to a fifth aspect, the present invention is directed to an automated method of lubricating a surface of a part or parts of a system using one or more shapable masses having a lubricant dispersion including a solid lubricant applied thereto to transfer lubricant to said part or parts of the system.

According to a sixth aspect, the present invention is directed to a self-lubricating system configured to implement the method according to any preceding claim, the system comprising one or more shapable masses that act as a carrier for a lubricating dispersion including a solid lubricant to lubricate at least one surface of the system to which it comes into contact, wherein:
  (i) the temperature, for example, bulk temperature of the shapable mass is not adversely affected by application of the lubricating dispersion; and/or
  (ii) the only solid lubricant is graphite; and/or
  (iii) the only lubricant is graphite: and/or
  (iv) the solid lubricant has a $d_{90}$ of less than about 150 microns; and/or
  (v) the lubricant dispersion is water-based; and/or
  (vi) the lubricant dispersion comprises dispersant and/or rheology modifier; and/or
  (vii) the lubricating dispersion applied does not produce carbon black following application to the shapable mass and/or during processing of the shapable mass into a shaped article.

According to a seventh aspect, the present invention is directed to a shapable mass having a lubricant dispersion applied to a surface thereof, wherein:
  (i) the temperature, for example, bulk temperature of the shapable mass is not adversely affected by application of the lubricating dispersion; and/or
  (ii) the only solid lubricant is graphite; and/or
  (iii) the only lubricant is graphite; and/or
  (iv) the solid lubricant has a $d_{90}$ of less than about 150 microns; and/or
  (v) the lubricant dispersion is water-based; and/or
  (vi) the lubricant dispersion comprises dispersant and/or rheology modifier; and/or
  (vii) the lubricating dispersion applied does not produce carbon black following application to the shapable mass and/or during processing of the shapable mass into a shaped article.

According to an eighth aspect, the present invention is directed to a shapable mass having a lubricant dispersion applied to a surface thereof, wherein from about 1% to about 50% of the surface has lubricant dispersion applied thereto.

According to a ninth aspect, the present invention is directed to the use of a shapable mass according to the seventh or eighth aspect for transferring lubricant in a system requiring lubrication.

According to a tenth aspect, the present invention is directed to a method of using a shapable mass according to the seventh or eighth aspect, the method comprising using the shapable mass to transfer lubricant to a part or parts of a system requiring lubrication.

According to an eleventh aspect, the present invention is directed to the use of a shapable mass according to the seventh or eighth aspect for improving efficiency in a system requiring lubrication.

According to a twelfth aspect, the present invention is directed to a method of using a shapable mass according to the seventh or eighth aspect for improving efficiency in a system requiring lubrication, the method comprising using the shapable mass to transfer lubricant to a part or parts of the system such that efficiency is improved.

According to a thirteenth aspect, the present invention is directed to the use of a shapable mass according to the seventh or eighth aspect for reducing waste in a system requiring lubrication.

According to a fourteenth aspect, the present invention is directed to a method of using a shapable mass according to the seventh or eighth aspect for reducing waste in a system requiring lubrication, the method comprising using the shapable mass to transfer lubricant to a part or parts of the system such that waste is reduced.

According to a fifteenth aspect, the present invention is directed to the use of a shapable mass according to the seventh or eighth aspect for reducing the amount of lubricant used in a system requiring lubrication.

According to a sixteenth aspect, the present invention is directed to a method of using a shapable mass according to the seventh or eighth aspect for reducing the amount of lubricant used in a system requiring lubrication, the method comprising using the shapable mass to transfer lubricant to a part or parts of the system such that the amount of lubricant used is reduced.

According to a seventeenth aspect, the present invention is directed to the use of a shapable mass according to the seventh or eighth aspect for increasing the utilization rate of shaping means in a system for shaping a shapable mass, wherein a lubricating dispersion including a solid lubricant is applied to the shapable mass prior to shaping the shapable mass in the shaping means.

According to an eighteenth aspect, the present invention is directed to a method of using a shapable mass according to the seventh or eighth aspect for increasing the utilization rate of shaping means in a system for shaping a shapable mass, wherein a lubricating dispersion including a solid lubricant is applied to the shapable mass prior to shaping the shapable mass in the shaping means.

According to a nineteenth aspect, the present invention is directed to the use of a lubricating dispersion including a solid lubricant for increasing the efficiency of a system requiring lubrication.

According to a twentieth aspect, the present invention is directed to the use of a lubricating dispersion including a solid lubricant for reducing waste in a system requiring lubrication.

DETAILED DESCRIPTION OF THE INVENTION

The methods and systems described herein are directed to improving the efficiency of manufacturing systems requiring lubrication. The methods and systems described herein are further directed to reducing waste in manufacturing systems requiring lubrication. Such improvements in efficiency and reduction in waste may be obtained through methods of applying lubricant to a part or parts of the system requiring lubrication during normal operation. Such improvements in efficiency and reduction in waste may be assessed relative to comparable methods and systems in which (A) a lubricant is applied either (i) manually to a part or parts of the system, or (ii) by flame or plasma spraying a shapable mass which is to be processed in the system, or (B) the lubricating composition applied produces carbon black following application to the shapable mass and/or during processing of the shapable mass into a shaped article.

Improvements in efficiency/reductions in waste may include:
  a reduction in energy usage, e.g., electrical and/or mechanical energy, during operation of the system and method;
  a reduction in the number of working parts of the system or method;
  simplification or elimination of control aspects;
  a reduction in wear and maintenance of parts and associated operating downtime;
  a reduction in wastage of partially used materials, e.g., lubricant which has been used but not spent (i.e., retains acceptable lubricating properties);
  reduction in the amount of waste by-products generated, e.g., volatile gaseous species, such as volatile organics;
  improving the lifetime of raw materials;
  reducing levels of substandard production articles, for example, resulting from over-application (or under-application) of lubricant during processing, thereby increasing productivity; and
  increased automation of the lubricating function, reducing need for human intervention and associated labour costs, as well as improving safety by reducing the number of, or eliminating the need for, human interventions.

In certain embodiments, efficiency is improved by at least about 1%, for example, at least about 2%, or at least about 5%, or at least about 10%, or at least about 15%, or at least about 20%, or at least about 25%. In certain embodiments, waste is reduced by at least 1%, or at least about 2%, or at least about 5%, or at least about 10%, or at least about 15%, or at least about 20%, or at least about 25%. As described above, the improvement in efficiency and reduction in waste may be assessed relative to comparable methods and systems in which (A) a lubricant is applied either (i) manually to a part or parts of the system, or (ii) by flame or plasma spraying a shapable mass which is to be processed in the system, or (B) the lubricating composition applied produces carbon black following application to the shapable mass and/or during processing of the shapable mass into a shaped article, for example, by comparing one or more of (i) unit cost, (ii) energy consumption (iii) lubricant consumption and (iv) waste produced per shapable mass processed in the system.

Reducing waste may include reducing the amount of volatile gaseous material (e.g., volatile organic material) generated during the processing of a shapable mass, for example, by reducing the amount of volatile gaseous materials produced as the lubricating dispersion is applied to the shapable mass and/or during further processing of the shapable mass in the method and system. For example, by having solid lubricant in the lubricating dispersion, the amount of volatalizable and/or vaporizable material in the lubricating dispersion may be reduced, even eliminated. Additionally, there are environmental and health benefits in reducing the amount of volatile gaseous materials generated during the processing of the shapable masses. Further, improvements in efficiency may ensue because less waste needs to be dealt with, e.g., contained or removed or disposed of.

Thus, in certain embodiments, reducing waste includes reducing the amount of volatile gaseous material generated during process of a shapable mass. For example, the amount of volatile gaseous material waste may be reduced by at least about 1%, or at least about 2%, or at least about 5%, or at least about 10%, or at least about 15%, or at least about 20%, or at least about 25%.

According to said methods, the shapable mass having lubricant dispersion applied thereon is used to transfer lubricant in the system, i.e., to transfer lubricant to a part or parts of the system with which the shapable mass comes into contact during processing into an article of commerce.

In certain aspects, the shapable mass having lubricant dispersion applied thereon is used to transfer lubricant in the system. As such, there is provided an automated method of lubricating a surface of a part or parts of a system using one or more shapable masses having a lubricant dispersion including a solid lubricant applied thereto to transfer lubricant to said part or parts of the system.

In certain embodiments, there is provided an automated method of lubricating a surface of a part or parts of a system using one or more shapable masses having a lubricant dispersion including a solid lubricant applied thereto as a vehicle for transferring lubricant to said part or parts of the system.

In certain embodiments, there is provided an automated method of lubricating a surface of a part or parts of a system using one or more shapable masses having a lubricant dispersion including a solid lubricant applied thereto, wherein the one or more shapable masses act as a carrier for transferring lubricant to said part or parts of the system.

In certain embodiments: (i) the amount of lubricating dispersion applied to the shapable mass is such that an amount of lubricant that transfers from the shapable mass to a surface of a part or parts of the system with which the shapable mass comes into contact is sufficient for lubricating the part(s) during at least one further processing cycle of a shapable mass which is to be processed in the system; and/or (ii) the amount of lubricating dispersion applied to the shapable mass is such that the next shapable mass to be processed in the same shaping means in a subsequent processing cycle is applied with a lower dosage of dispersion; and/or (iii) the amount of lubricating dispersion applied to the shapable mass is such that no dispersion is applied to the next shapable mass which is to be processed in the same shaping means in a subsequent processing cycle; and/or (iv) the only solid lubricant is graphite; and/or (v) the only lubricant is graphite; and/or (vi) the solid lubricant has a $d_{90}$ of less than about 150 microns; and/or (vii) the lubricant dispersion is water-based; and/or (viii) the lubricant dispersion comprises dispersant and/or rheology modifier; and/or (ix) the shapable mass is stationary as the lubricating dispersion is applied; and or (x) the lubricating dispersion applied does not produce carbon black following application to the shapable mass and/or during processing of the shapable mass into a shaped article; and/or (xi) the temperature, for example, the bulk temperature of the shapable mass is not adversely affected upon application of the lubricating dispersion.

The Lubricating Dispersion

The lubricating dispersion comprises a lubricant. In certain embodiments, the lubricating dispersion comprises, consists essentially of, or consists of, a solid lubricant. In certain embodiments, a solid lubricant is the sole or only lubricant present in the lubricating dispersion. In certain embodiments, the lubricating dispersion does not comprise, or is free of, any material which may form (i.e., be converted to) as a solid lubricant upon or during application of the liquid dispersion to the shapable mass.

The lubricant, e.g., solid lubricant, is applied to the shapable mass via a lubricating dispersion including the lubricant. The solid lubricant may be in powder form. In certain embodiments, the solid lubricant is or comprises a solid lubricant selected from graphite, molybdenum disulfide, tungsten disulfide, hexagonal boron nitride or mixtures thereof. In certain embodiments, the solid lubricant is or comprises graphite. In certain embodiments, the solid lubricant comprises, consists essentially of, or consists of graphite. In certain embodiments, graphite is the sole or only lubricant present in the lubricating dispersion. In certain embodiments, graphite is the sole or only solid lubricant present in the lubricating dispersion. The graphite may be synthetic and/or natural in origin. In certain embodiments, the graphite is synthetic. In certain embodiments, the graphite is natural.

In certain embodiments, the solid lubricant, for example, graphite, has a particle size characterized by a $d_{90}$ of less than about 150 microns (90 percent of the particles are smaller than 150 microns), or less than about 75 microns, or less than about 50 microns measured by a laser diffraction device such as the Malvern Mastersizer S with sample dispersion unit (see the measurement methods below). In certain embodiments, the solid lubricant is Timrex® KS 44 graphite, which is available from Timcal Graphite & Carbon, a member of IMERYS, which has a $d_{90}$ of approximately 44 microns. The lubricant, for example, graphite lubricant, could include particle sizes in the submicron range such as, for example, colloidal graphite. In certain embodiments, the lubricant, for example, graphite lubricant does not comprise particle sizes in the submicron range. In certain embodiments, the graphite is not, or does not comprise, colloidal graphite.

A brief description of a measuring method using particle size distribution by laser diffraction will now be briefly presented. The presence of particles within a coherent light beam causes diffraction. The dimensions of the diffraction pattern are correlated with the particle size. A parallel beam from a low-power laser lights up a cell which contains the sample suspended in water. The beam leaving the cell is focused by an optical system. The distribution of the light energy in the focal plane of the system is then analyzed. The electrical signals provided by the optical detectors are transformed into by means of a calculator. The particle size distribution is typically expressed in volume fraction below a specific particle diameter: $d_{90}$ means 90 percent of the volume of the particles has a diameter below the given value. A small sample of graphite is mixed with a few drops of wetting agent and a small amount of water. The sample prepared in the described manner is introduced in the storage vessel of the apparatus and measured. Applicable standards include ISO 13320 1 and ISO 14887.

In certain embodiments, the lubricating dispersion does not comprise carbon black. In certain embodiments, the lubricating dispersion does not produce carbon black following application to the shapable mass and/or during processing of the shapable mass into a shaped article. In certain embodiments, the lubricating dispersion does not comprise, or is substantially free of, a component or components, for example, a carboniferous component or components, which produce carbon black when heated to a sufficiently high temperature, e.g., when combusted.

In certain embodiments, the lubricating dispersion is a liquid-based dispersion, optionally with the liquid base making up from about 50 percent by weight to about 98 percent by weight of the lubricating dispersion, for example, from about 60 percent by weight to about 80 percent by weight of the lubricating dispersion, or from about 65 percent by weight to about 75 percent by weight of the lubricating dispersion. In certain embodiments, the lubricating dispersion is water-based. In certain embodiments, the lubricating dispersion is an organic solvent-based dispersion in which the lubricating solid is dispersed in an organic solvent such as mineral oil, vegetable oil, iso propanol, or methyl ethyl ketone. Stabilizing additives or agents that can be used with organic solvent-based dispersions include hydrogenated castor oil derivatives like RHEOCIN® Mastergels from Rockwood Specialties Group of Princeton, N.J., ISCATHIX® ISP from Isca UK LTD of Wales, UK, organophilic bentonites like TIXOGEL® VP V (Quaternium 90

Bentonite) and TIXOGEL® VZ V (Stearalkonium Bentonite) from Rockwood Specialties Group, or pre activated amide waxes like CRAYVALLAC® PA3 from Arkema Coated Resins of Cary, N.C.

The lubricating dispersion may additionally comprise a dispersing agent (a wetting agent), a rheological modifier, and/or other lubricant additives.

In certain embodiments, the dispersing agent is a PEO PPO PEO block copolymer. Alternative dispersing agents are ionic dispersants like sulphonates, non ionic dispersants like alcohol polyethoxylates, or alkyl polyether, or any other dispersants known to those skilled in the field of pigment dispersion. The dispersing agent may constitute from about 0.01 percent to about 20 percent by weight of the lubricating dispersion, for example, from about 0.1 percent to about 5 percent of the lubricating dispersion, or from about 0.25 percent to about 1 percent of the lubricating dispersion.

The rheological modifier may serve as a thickener and, in certain embodiments, is a polysaccharide or Xanthan gum. Alternative rheological modifiers are inorganic thickeners like phillosilicates, or other organic thickeners like carboxy methyl cellulose or cellulose ethers, or like polyacrylates, or like polyurethanes, or any other thickeners known to those skilled in the fields of pigment dispersion. The rheological modifier may constitute from about 0.01 percent by weight to about 25 percent by weight of the lubricating dispersion, for example, from about 0.1 percent to about 5 percent by weight of the lubricating dispersion, or from about 0.15 to about 1 percent of the lubricating dispersion.

In certain embodiments, other lubricant additives may be included such as binder materials like inorganic binder materials such as silicates, or organic binder materials like polyvinyl acetates, or polyurethanes. The binder may function to enhance lubricant adhesion to the shapable mass and/or the part or parts of the system requiring lubrication, therefore enhancing the lubrication qualities of the dispersion. In certain embodiments, binder constitutes from about 0.01 percent to about 30 percent by weight, for example, from about 0.1 to about 15 percent by weight, or from about 1 percent to about 10 percent of the lubricating dispersion.

Additional lubricants additives that may be included are a pH modifier like ammonia or amines, or any other pH modifier known to those skilled in the field of pigment dispersion. Other lubricants additives are a defoamer like mineral oils or a silicon based or equivalent defoamer known to those skilled people in the field of pigment dispersion. Preservatives or biocides can also be included in the dispersion to improve its shelf life.

In certain embodiments, the lubricating dispersion comprises less than about 50% by weight of volatalizable and/or vaporizable material, excluding any water in the dispersion, for example, less than about 40% by weight, or less than about 30% by weight, or less than about 20% by weight, or less than about 15% by weight, or less than about 10% by weight, or less than about 5% by weight, or less than about 2% by weight, or less than about 1% by weight of volatalizable and/or vaporizable material. In certain embodiments, excluding any water present, the lubricating dispersion is essentially free of volatalizable and/or vaporizable material.

Application of the Lubricating Dispersion

In certain embodiments, the lubricating dispersion is applied to the shapable mass prior to contact with a part or parts of the system in which the shapable mass is processed to form a shaped article. In certain embodiments, the part or parts include a surface of a shaping means in which the shapable mass is shaped and/or a surface of delivery means for conveying the shapable mass to the shaping means. In certain embodiments, the lubricating dispersion is applied to the shapable mass prior to contact with any part or parts of the system in which the shapable mass is produced to form a shaped article. In certain embodiments, the lubricating dispersion is applied prior to contact with any delivery means for conveying the shapable mass to the shaping means.

In certain embodiments, the shaping means is a mold, for example, a blow mold and/or a blank mold, and at least a portion of lubricant transfers from the shapable mass to at least a portion of an inner surface of the mold as the shapable mass comes into contact with the mold, e.g., loaded or delivered or directed into the mold. In other embodiments, the shaping means is a dye, or a press, or an extruder.

In certain embodiments, the delivery means for conveying the shapable mass comprises one or more of a scoop, trough, chute, guide-track, director, deflector or any other means suitable for guiding or directing the shapable mass between a point of formation of the shapable mass and the shaping means.

In certain embodiments, the shapable mass is in motion during application of the lubricating dispersion, for example, in free fall.

In certain embodiments, the shapable mass is stationary as the lubricating dispersion is applied. For example, in certain embodiments, the lubricating dispersion is applied immediately following forming of the shapable mass and before the shapable mass is released or otherwise set apart from a mass forming means.

In certain embodiments, the shapable mass is (i) enclosed as the lubricating dispersion is applied, or (ii) is not enclosed as the lubricating dispersion is applied.

In certain embodiments, the amount of lubricating dispersion to be applied is sufficient to cover, coat or extend about at least a portion of the surface of the shapable mass. In certain embodiments, the amount of lubricant dispersion applied is sufficient to cover, coat or extend about from about 1% to about 99% of the surface area of the shapable mass, for example, from about 1% to about 75%, or from about 1% to about 50%, or from about 1% to about 40%, or from about 1% to about 30%, or from about 1% to about 20%, or from about 1% to about 10%. For example, the amount of lubricant dispersion applied may be sufficient to cover, coat or extend about at least about 2% of the surface area of the shapable mass, for example, at least about 5%, or at least about 10%, or at least about 15%, or at least about 20% of the surface area of the shapable mass.

In certain embodiments, the amount of lubricating dispersion applied, e.g., sprayed, to the shapable mass is such that (i) an amount of lubricant transfers from the shapable mass to a surface(s) of the part(s) of the system with which the shapable mass comes into contact and which is sufficient for lubricating the part(s) during at least one subsequent processing cycle of a further shapable mass.

In certain embodiments in which the shapable mass is shaped in a shaping means, the amount of lubricating dispersion applied, e.g., sprayed, to the shapable mass is such that the next shapable mass to be processed in the same shaping means in a subsequent processing cycle is applied with a lower dosage of lubricating dispersion.

In certain embodiments in which shapable mass is shaped in a shaping means, the amount of lubricating dispersion applied, e.g., sprayed, to the shapable mass is such that no dispersion needs to be applied to the next shapable mass which is to be processed in the same shaping means in a subsequent processing cycle.

Because not every shapable mass in a series of processing cycles needs to have lubricating applied, or may have a lower amount of lubricating dispersion applied compared to a shapable mass in a previous processing cycle, lubricant may be used more efficiently.

For example, in a continuous method in which two or more (or a plurality of) shapable masses are processed sequentially in the system in a given period of time, the lubricating dispersion may be applied to no more than every other shapable mass in the sequence, or no more than every second shapable mass in the sequence, or no more than every third shapable mass in the sequence, or no more than every fourth shapable mass in the sequence, or no more than about fifth shapable mass in the sequence, or no more than every sixth shapable mass in the sequence, or no more than every seventh shapable mass in the sequence, or no more than every eighth shapable mass in the sequence, or no more than every ninth shapable mass in the sequence, or no more than every tenth shapable mass in the sequence, and so on. In certain embodiments, less than about 50% of the shapable masses have lubricating dispersion applied, for example, less than about 40%, or less than about 30%, or less than about 20%, or less than about 10%, or less than about 5%, or less than about 2%, or less than about 1% of the shapable masses have lubricating dispersion applied. Because not every shapable mass in the sequence must necessarily have lubricating dispersion applied thereto, the efficiency of the method and system may be improved.

In certain embodiments, in each processing cycle two or more (or a plurality of) shapable masses are processed essentially simultaneously.

In certain embodiments, a shapable mass is part of an array of like masses which are processed essentially simultaneously. An array may comprise two, or three, or four, or five, or more like shapable masses arranged linearly, or in any other special arrangement which enables essentially simultaneous processing in a processing cycle. In such embodiments, a processing cycle means processing of one array of shapable masses. Thus, for example, if 10 cycles of an array consisting of four like shapable masses are processed, 40 shapable masses in total would have been processed during the 10 cycles.

Thus, in certain aspects, there is provided a method of increasing the utilization rate of shaping means, e.g., mold, in a system for shaping a shapable mass, said method comprising applying a lubricating dispersion including a solid lubricant to the shapable mass prior to shaping the shapable mass in the shaping means, e.g., mold, as well as a method of reducing the amount of lubricant used in a system requiring lubrication, said method comprising applying a lubricant dispersion to a shapable mass to be processed in the system such that lubricant is transferred from the shapable mass to a part of parts of the system requiring lubrication, thereby reducing the amount of lubricant used in the system. The increase in utilization rate and/or reduction in the amount of lubricant used may be assessed relative to comparable methods and systems in which (A) a lubricant is applied either (i) manually to a part or parts of the system, or (ii) by flame or plasma spraying a shapable mass which is to be processed in the system, or (iii) to every shapable mass which is processed according to the method or in the system; or (B) the lubricating composition applied produces carbon black following application to the shapable mass and/or during processing of the shapable mass into a shaped article, for example, by comparing the number of shapable masses processed in the system in any given period of time, or by comparing the amount of lubricant consumed in the system per shapable mass process in the system. In certain embodiments, the utilization rate of the shaping means is increased by at least about 1%, or at least about 2%, or at least about 3%, or at least about 4%, or at least about 5%, or at least about 6%, or at least about 7%, or at least about 8%, or at least about 9%, or at least about 10%. In certain embodiment, the amount of lubricant used is reduced by at least about 1%, or at least about 2%, or at least about 5%, or at least about 10%, or at least about 15%, or at least about 20%, or at least about 25%.

As described above, in certain embodiments, the lubricating dispersion is applied by spraying. As used herein, the term "spraying" does not include flame spraying or plasma spraying. The lubricating dispersion may be sprayed via or from one or more, e.g., two or more (or a plurality of), points about the shapable mass. In certain embodiments, the lubricating dispersion is applied via one or more, e.g., two or more (or a plurality of), apertures located about the shapable mass.

In other embodiments, the lubricating dispersion is applied as the shapable mass passes through or is passed through or is contacted with or contacts a body of lubricant dispersion. The body may be a pool or a layer or thin film of lubricating dispersion.

In certain embodiments, the lubricating dispersion is applied by dipping at least portion of, or submersing, the shapable mass in a body of lubricating dispersion.

In certain embodiments, the lubricating dispersion comprising a solid lubricant is applied to a combustible (e.g., at temperatures above about 50° C.) and/or frangible film or layer and solid lubricant adheres to the shapable mass as it passes through or is passed through the combustible and/or frangible film or layer.

In certain embodiments, the lubricating dispersion comprising a solid lubricant is applied by brushing.

In certain embodiments, the solid lubricant is applied by electrostatic discharge on the shapable mass as it passes or is passed through a lubricating dispersion comprising powdered solid lubricant.

In certain embodiments, the temperature, for example, bulk temperature, of the shapable mass does is not adversely affected upon application of the lubricating dispersion. By "not adversely affected" is meant the bulk temperature of the shapable mass may vary (e.g., cool) upon application of the lubricant, but not to the extent that the overall process for manufacturing an article from the shapable mass needs to be adjusted to compensate for any variance in bulk temperature. In certain embodiments, the bulk temperature of the shapable mass does not decrease by more than about 100° C. upon application of the lubricating dispersion, for example, does not decrease by more than about 75° C. upon application of the lubricating dispersion, or does not decrease by more than about 50° C. upon application of the lubricating dispersion, or does not decrease by more than about 35° C. upon application of the lubricating dispersion, or does not decrease by more than about 20° C. upon application of the lubricating dispersion, for example, does not decrease by more than about 15° C., or does not decrease by more than about 10° C., or does not decrease by more than about 5° C., or does not decrease by more than about 2° C., or does not decrease by more than about 1° C. upon application of the lubricating dispersion. In certain, the temperature, for example, bulk temperature of the shapable mass does not decrease by less than about 1° C., or does not decrease, upon application of the lubricating dispersion.

In certain embodiments, the lubricating dispersion is heated prior to application or during application. The lubricating dispersion may be heated to a temperature above about 50° C., or above about 75° C.

In certain embodiments, the shapable mass is a hot body, for example, a moldable hot body. The hot body may have a temperature, for example, bulk temperature, of at least about 200° C., for example, or at least about 300° C., or at least about 400° C., or at least about 500° C., or at least about 750° C. or at least about 1000° C. or at least about 1250° C. or at least about 1500° C. In certain embodiments, the temperature is less than about 2000° C.

In certain embodiments, the shapable mass is a ceramic precursor, or a metallic precursor, or a glass precursor, optionally in a molten state. In certain embodiments, the shapable mass is a polymeric precursor. By "precursor" is meant a composition of matter from which an article may be formed by shaping, e.g., molding. In certain embodiments, the lubricant transfer shapable mass is not glass. In certain embodiments, the shapable mass is not a glass precursor. In certain embodiments, the shapable mass is not a molten glass gob.

As described herein, in certain embodiments, the shapable mass is processed by shaping, e.g., molding, into a shaped article. Articles which may be manufactured according to the methods and systems are many and various and include, for example, shaped ceramic articles and shaped metallic articles.

In certain embodiments, the method of any aspect further comprises forming (e.g., molding) an article of commerce from the shapable mass and inspecting the article, e.g., for defects. Inspection may be manual and/or automated. In certain embodiments, the method of any aspect further comprises forming (e.g., molding) an article of commerce from the shapable mass and packaging the article for distribution, for example, packaging the article for transportation to a customer facility. In certain embodiments, the article of commerce is inspected (e.g., manually and/or automatically) and then packaged for distribution.

According to a further aspect, a system configured to implement the methods described herein is provided, the system comprising one or more parts for applying lubricant dispersion including solid lubricant to a shapable mass. Further embodiments of the system are provided and configured in order to implement the embodiments of the methods described herein. In certain embodiments, the system additionally comprises an inspection zone for inspecting (manually and/or automatically) articles of commerce formed (e.g., molded) in the system. In certain embodiments, the system additionally comprises a packaging zone where articles of commerce formed in the system may be packaged for distribution, for example, packaged for transportation to a customer facility. In certain embodiments, the system additionally comprises an inspection zone and a packaging zone.

For the avoidance of doubt, the present application is also directed to the subject-matter described in the following numbered paragraphs:

1. A method for improving the efficiency of a system requiring lubrication, the method comprising applying a lubricating dispersion including a solid lubricant to a shapable mass which is to be processed in the system, such that or whereby, the efficiency of the system is improved, wherein the shapable mass is not a molten glass gob.

2. A method of reducing waste in a system requiring lubrication, the method comprising applying a lubricating dispersion including a solid lubricant to a shapable mass which is to be processed in the system, such that or whereby waste is reduced, wherein the shapable mass is not a molten glass gob.

3. A method according to numbered paragraph 1 or 2, wherein efficiency is improved and/or waste is reduced relative to a system in which (A) a lubricant is applied either (i) manually to a part or parts of the system or (ii) by flame or plasma spraying a shapable mass, or (B) the lubricating composition applied produces carbon black following application to the shapable mass and/or during processing of the shapable mass into a shaped article.

4. A method according to any preceding numbered paragraph, wherein efficiency is improved by and/or waste is reduced by at least about 1%, for example, at least about 2%, or at least about 5%, or at least about 10%.

5. A method according to any preceding numbered paragraph, wherein the lubricating dispersion is applied to the shapable mass prior to contact with a part or parts of the system in which the shapable mass is processed to form a shaped article.

6. A method according to numbered paragraph 5, wherein the part or parts include a surface of a shaping means in which the shapable mass is shaped and/or delivery means for conveying the shapable mass to the shaping means.

7. A method according to any preceding numbered paragraph, wherein the amount of lubricating dispersion applied to the shapable mass is such that (i) an amount of lubricant transfers from the shapable mass to a surface(s) of the part(s) of the system in which the shapable mass comes into contact and which is sufficient for lubricating the part(s) during at least one subsequent processing cycle of a further shapable mass, or (ii) the next shapable mass to be processed in the same shaping means in a subsequent processing cycle is applied with a lower dosage of dispersion, or (ii) no dispersion is applied to the next shapable mass which is to be processed in the same shaping means in a subsequent processing cycle.

8. A method according to any preceding numbered paragraph, wherein the shapable mass is a hot mass, for example, a molten mass.

9. A method according to any preceding numbered paragraph, wherein the shaping means is a mold for molding the shapable mass.

10. A method according to any preceding numbered paragraph, wherein the shapable mass is in motion, for example, free falling as the lubricating dispersion is applied.

11. A method according to any one of numbered paragraphs 1-9, wherein the shapable mass is stationary as the lubricating dispersion is applied.

12. A method according to numbered paragraph 11, wherein the lubricating dispersion is applied immediately following forming of the shapable mass.

13. A method according to any preceding numbered paragraph, wherein the shapable mass is (i) enclosed as the lubricating dispersion is applied, or (ii) is not enclosed as the lubricating dispersion is applied.

14. A method according to any preceding numbered paragraph, wherein two or more shapable masses are processed sequentially in the system in a given period of time, and wherein the lubricating dispersion is applied to no more than every other shapable mass in the sequence.

15. A method according to any preceding numbered paragraph, wherein two or more of like shapable masses are processed essentially simultaneously in the system.

16. A method of increasing the utilization rate of shaping means in a system for shaping a shapable mass, said method comprising applying a lubricating dispersion including a solid lubricant to the shapable mass prior to shaping the shapable mass in the shaping means, wherein the shapable mass is not a molten glass gob.

17. A method of reducing the amount of lubricant used in a system requiring lubrication, said method comprising applying a lubricant dispersion to a shapable mass to be processed in the system such that lubricant is transferred from the shapable mass to a part of parts of the system requiring lubrication, thereby reducing the amount of lubricant used in the system, wherein the shapable mass is not a molten glass gob.

18. A method according to numbered paragraph 16 or 17, wherein the utilization rate is increased and/or reduction in the amount of lubricant used is reduced relative to a system in which (A) a lubricant is applied either (i) manually to a part or parts of the system, or (ii) by flame or plasma spraying a shapable mass which is to be processed in the system, or (iii) to every shapable mass which is processed according to the method or in the system; or (B) the lubricating composition applied produces carbon black following application to the shapable mass and/or during processing of the shapable mass into a shaped article.

19. A method according anyone of numbered paragraphs 16-18, wherein the utilization rate is increased by, and/or the amount of lubricant used is reduced by, at least 1%.

20. An automated method of lubricating a surface of a part or parts of a system using one or more shapable masses having a lubricant dispersion including a solid lubricant applied thereto to transfer lubricant to said part or parts of the system, wherein the shapable mass is not a molten glass gob.

21. An automated method according to numbered paragraph 20, wherein:
(i) the amount of lubricating dispersion applied to the shapable mass is such that an amount of lubricant that transfers from the shapable mass to a surface of the part or parts of the system with which the shapable mass comes into contact is sufficient for lubricating the part(s) during at least one further processing cycle of a shapable mass which is to be processed in the system; and/or
(ii) the amount of lubricating dispersion applied to the shapable mass is such that the next shapable mass to be processed in the same shaping means in a subsequent processing cycle is applied with a lower dosage of dispersion; and/or
(iii) the amount of lubricating dispersion applied to the shapable mass is such that no dispersion is applied to the next shapable mass which is to be processed in the same shaping means in a subsequent processing cycle; and/or
(iv) the solid lubricant is graphite; and/or
(v) the only lubricant is graphite; and/or
(vi) the solid lubricant has a $d_{90}$ of less than about 150 microns; and/or
(vii) the lubricant dispersion is water-based; and/or
(viii) the lubricant dispersion comprises dispersant and/or rheology modifier; and/or
(ix) the shapable mass is stationary as the lubricating dispersion is applied; and/or
(x) the lubricating dispersion applied does not produce carbon black following application to the shapable mass and/or during processing of the shapable mass into a shaped article; and/or
(xi) the temperature, for example, bulk temperature of the shapable mass is not adversely affected by application of the lubricating dispersion.

22. A self-lubricating system configured to implement the method according to any preceding numbered paragraph, the system comprising one or more shapable masses that act as a carrier for a lubricating dispersion including a solid lubricant to lubricate at least one surface of the system to which it comes into contact, wherein:
(i) the temperature, for example, bulk temperature of the shapable mass is not adversely affected by application of the lubricating dispersion; and/or
(ii) the only solid lubricant is graphite; and/or
(iii) the only lubricant is graphite: and/or
(iv) the solid lubricant has a $d_{90}$ of less than about 150 microns; and/or
(v) the lubricant dispersion is water-based; and/or
(vi) the lubricant dispersion comprises dispersant and/or rheology modifier; and/or
(vii) the lubricating dispersion applied does not produce carbon black following application to the shapable mass and/or during processing of the shapable mass into a shaped article.

23. A self-lubricating system according to numbered paragraph 22, wherein the shapable mass is processed in the system to obtain a shaped article therefrom.

24. A shapable mass having a lubricant dispersion applied to a surface thereof, wherein the shapable mass is not a molten glass gob, and wherein:
(i) the temperature, for example, bulk temperature of the shapable mass is not adversely effected by application of the lubricating dispersion; and/or
(ii) the only solid lubricant is graphite; and/or
(iii) the only lubricant is graphite; and/or
(iv) the solid lubricant has a $d_{90}$ of less than about 150 microns; and/or
(v) the lubricant dispersion is water-based; and/or
(vi) the lubricant dispersion comprises dispersant and/or rheology modifier; and/or
(vii) the lubricating dispersion applied does not produce carbon black following application to the shapable mass and/or during processing of the shapable mass into a shaped article.

25. A shapable mass having a lubricant dispersion applied to a surface thereof, wherein from about 1% to about 50% of the surface has lubricant dispersion applied thereto, and wherein the shapable mass is not a molten glass gob.

26. Use of a shapable mass according to numbered paragraph 24 or 25 for transferring lubricant in a system requiring lubrication.

27. A method of using a shapable mass according to numbered paragraph 24 or 25, the method comprising using the shapable mass to transfer lubricant to a part or parts of a system requiring lubrication.

28. Use of a shapable mass according to numbered paragraph 24 or 25 for improving efficiency in a system requiring lubrication.

29. A method of using a shapable mass according to numbered paragraph 24 or 25 for improving efficiency in a system requiring lubrication, the method comprising using the shapable mass to transfer lubricant to a part or parts of the system such that efficiency is improved.

30. Use of a shapable mass according to numbered paragraph 24 or 25 for reducing waste in a system requiring lubrication.

31. A method of using a shapable mass according to numbered paragraph 24 or 25 for reducing waste in a system requiring lubrication, the method comprising using the shapable mass to transfer lubricant to a part or parts of the system such that waste is reduced.

32. Use of a shapable mass according to numbered paragraph 24 or 25 for reducing the amount of lubricant used in a system requiring lubrication.

33. A method of using a shapable mass according to numbered paragraph 24 or 25 for reducing the amount of lubricant used in a system requiring lubrication, the method comprising using the shapable mass to transfer lubricant to a part or parts of the system such that the amount of lubricant used is reduced.

34. Use of a shapable mass according to numbered paragraph 24 or 25 for increasing the utilization rate of shaping means in a system for shaping a shapable mass, wherein a lubricating dispersion including a solid lubricant is applied to the shapable mass prior to shaping the shapable mass in the shaping means.

35. A method of using a shapable mass according to numbered paragraph 24 or 25 for increasing the utilization rate of shaping means in a system for shaping a shapable mass, wherein a lubricating dispersion including a solid lubricant is applied to the shapable mass prior to shaping the shapable mass in the shaping means.

36. Use of a lubricating dispersion including a solid lubricant for increasing the efficiency of a system requiring lubrication, wherein the system does not comprise a molten glass gob.

37. Use of a lubricating dispersion including a solid lubricant for reducing waste in a system requiring lubrication, wherein the system does not comprise a molten glass gob.

38. A method, system or use according to any preceding claim, wherein the lubricating dispersion is applied by spraying.

39. A method, system or use according to any one of numbered paragraphs 1-37, wherein the lubricating dispersion is applied as the shapable mass passes through or is passed through a body of lubricant dispersion.

40. A method, system or use according to any one of numbered paragraphs 1-37, wherein the lubricating dispersion is applied by dipping or submersing the shapable mass in a body of lubricant dispersion.

41. A method, system or use according to any one of numbered paragraphs 1-37, wherein the lubricating dispersion is applied by brushing.

42. A method, system or use according to any one of numbered paragraphs 1-37, wherein the solid lubricant is applied by electrostatic discharge on the shapable mass as it passes or is passed through a lubricating dispersion comprising powdered solid lubricant.

43. A method, system or use according to any preceding numbered paragraph, wherein the lubricating dispersion is a liquid-based lubricating dispersion.

44. A method, system or use according to numbered paragraph 43, wherein the lubricating dispersion is water-based.

45. A method, system or use according to any preceding numbered paragraph, wherein the solid lubricant is graphite.

46. A method, system or use according to any preceding numbered paragraph, wherein the solid lubricant has a $d_{90}$ of less than about 150 microns.

47. A method, system or use according to any preceding, wherein the lubricating dispersion comprises dispersant and/or rheology modifier.

48. A method, system or use according to any preceding numbered paragraph, wherein the shapable mass is a hot body, for example, a mouldable hot body.

49. A method, system or use according to any preceding numbered paragraph, wherein the shapable mass is a ceramic precursor, or a metallic precursor, or a polymeric precursor, optionally in a molten state.

50. A method, system or use according to any preceding numbered paragraph, wherein less than about 50% of the shapable masses have lubricating dispersion applied.

51. A method according to any preceding method numbered paragraph, wherein an article of commerce is formed from the shapable mass, and the article is inspected and/or packaged for distribution.

52. A system according to any preceding system numbered paragraph, wherein the system additionally comprises an inspection zone and/or a packaging zone.

For the avoidance of doubt, the present application is also directed to the subject-matter described in the following numbered sentences:

1A. A method comprising coating shapable masses, which are other than glass gobs, with a liquid-based lubricating dispersion during their drop to blank container molds, wherein:
  (i) the liquid-based lubricating dispersion comprises a solid lubricant having a $d_{90}$ of below 150 microns; and/or
  (ii) the liquid-based lubricating dispersion comprises a solid lubricant that is graphite; and/or
  (iii) the shapable masses are free falling.

2A. A method according to numbered sentence 1A, which provides sufficient lubrication to the article container molds without requiring swabbing of the container molds.

3A. A method for lubrication of article container manufacturing molds, said method comprising coating shapable masses, which are other than glass gobs, with a liquid-based lubricating dispersion during their drop to blank container molds which provides sufficient lubrication to the container molds without requiring swabbing of the container molds.

4A. A method according to any one of numbered sentences 1A-3A, wherein the liquid-based lubricating dispersion comprises a solid lubricant having a $d_{90}$ below 150 microns, optionally wherein the solid lubricant is graphite.

5A. A system for implementing the method according to any one of numbered sentences 1A-4A, wherein the system comprises a liquid-based lubricating dispersion, and wherein:
  (i) the liquid-based lubricating dispersion comprises a solid lubricant having a $d_{90}$ of below 150 microns; and/or
  (ii) the liquid-based lubricating comprises a solid lubricant that is graphite; and/or
  (iii) the system is configured such that the shapable masses are free falling during coating.

6A. Use of a liquid-based lubricating dispersion in a system according to numbered sentence 5A or for coating shapable masses, which are other than glass gobs, during their drop to blank container molds, wherein:
  (i) the liquid-based lubricating dispersion comprises a solid lubricant which has a $d_{90}$ below 150 microns; and/or
  (ii) the solid lubricant is graphite; and/or
  (iii) the shapable masses are free falling during coating.

7A. A method of applying falling shapable masses, which are other than glass gobs, with a liquid-based lubricating dispersion to lubricate them prior to their entry into blank molds, wherein:
  (i) the liquid-based lubricating dispersion comprises a solid lubricant having a $d_{90}$ of below 150 microns; and/or (ii) the liquid-based lubricating dispersion comprises a dispersing agent and/or a rheology modifier; and/or
(iii) wherein the shapable masses are free falling.

8A. A method for at least minimizing the need for lubricating every shapable mass, which is other than a glass gob, said method comprising applying falling shapable masses, which are other than glass gobs, with a lubricating dispersion to lubricate them prior to their entry into blank molds.

9A. A method according to numbered sentence 7A or 8A, wherein the lubricating dispersion is applied onto the falling shapable masses, which are other than glass gobs, after they have been cut by a shears mechanism from a molten stream supplied by a shapable mass feeder, and before the falling shapable masses enter funnels leading to scoops, troughs and deflectors in a shapable mass distribution system which distributes them to the blank molds.

10A. A method according to any one of numbered sentences 7A-9A, wherein the shapable masses are coated with the lubricating dispersion, optionally wherein the lubricating dispersion is applied by spraying.

11A. A method according to any one of numbered sentences 7A-10A, wherein the lubricating dispersion is a liquid-based lubricating dispersion comprising a solid lubricant having a $d_{90}$ below 150 microns, optionally wherein the solid lubricant is graphite.

12A. A system for implementing the method according to any one of numbered sentences 7A-11A, wherein:
(i) the system comprises a lubricating dispersion comprising a solid lubricant having a $d_{90}$ of below 150 microns; and/or
(ii) the lubricating dispersion comprises a dispersing agent and/or a rheology modifier; and/or
(iii) the system is configured such that the shapable masses are free falling during application of the lubricating dispersion.

13A. Use of a lubricating dispersion in a system according to numbered sentence 12A or for lubricating falling shapable masses, which are other than glass gobs, prior to their entry into blank molds, wherein:
(i) the lubricating dispersion comprises a solid lubricant having a $d_{90}$ below 150 microns; and/or
(ii) the lubricating dispersion comprises a dispersing agent and/or a rheology modifier; and/or
(iii) the shapable masses are free falling during application of the lubricating dispersion.

14A. A method for applying a lubricating dispersion comprising a solid lubricant to free falling shapable masses, which are other than glass gobs, wherein:
(i) the lubricating dispersion comprises a solid lubricant having a $d_{90}$ of below 150 microns; and/or
(ii) the lubricating dispersion comprises a dispersing agent and/or a rheology modifier.

15A. A method according to numbered sentence 14A, wherein the shapable masses are not in contact with any portion of a shapable mass distribution system during application of the lubricating dispersion.

16A. A method according to numbered sentence 14A or 15A, wherein the lubricating dispersion is a liquid-based lubricating dispersion.

17A. A method according to any one of numbered sentences 14A-16A, additionally providing lubrication to a shapable mass distribution system.

18A. A system for implementing the method of any one of numbered sentences 14A-17A, for example, a shapable mass distribution system, wherein:

(i) the system comprises a lubricating dispersion comprising a solid lubricant having a $d_{90}$ of below 150 microns; and/or
(ii) the lubricating dispersion comprises a dispersing agent and/or a rheology modifier.

19A. Use of a lubricating dispersion in a system according to numbered sentence 18A or for lubricating free falling shapable masses, which are other than glass gobs, wherein:
(i) the lubricating dispersion comprises a solid lubricant having a $d_{90}$ below 150 microns; or
(ii) the lubricating dispersion comprises a dispersing agent and/or a rheology modifier.

20A. A method for applying a lubricating dispersion to falling shapable masses, which are other than glass gobs, said method comprising applying the lubricating dispersion to the falling shapable masses as they fall through an enclosure.

21A. A method according to numbered sentence 20A, wherein:
(i) the system comprises a liquid-based lubricating dispersion; and/or
(ii) the lubricating dispersion comprises a solid lubricant having a $d_{90}$ of below 150 microns; and/or
(iii) the lubricating dispersion comprises a dispersing agent and/or a rheology modifier.

22A. A method according to numbered sentence 20A or 21A, wherein the lubricating dispersion is applied via a plurality of nozzles mounted in or adjacent to the enclosure, each of the nozzles being arranged and configured to apply the lubricating dispersion therefrom, optionally wherein the lubricating dispersion is applied periodically to one shapable mass out of a series of N shapable masses, wherein N varies from 2 to 30.

23A. A method according to any one of numbered sentences 20A-22A, wherein the lubricating dispersion is a liquid-based lubricating dispersion.

24A. A method according to any one of numbered sentences 20A-23A, wherein the lubricating dispersion comprises a solid lubricant having a $d_{90}$ of less than 150 microns.

25A. A method according to any one of numbered sentences 20A-24A, wherein the lubricating dispersion is applied to the falling shapable masses by spraying.

26A. A system for implementing the method according to any one of numbered sentences 20A-25A, optionally wherein:
(i) the system comprises a liquid-based lubricating dispersion; and/or
(ii) the system comprises a lubricating dispersion which comprises a solid lubricant having a $d_{90}$ of below 150 microns; and/or
(iii) the system comprises a lubricating dispersion which comprises a dispersing agent and/or a rheology modifier;

27A. Use of a lubricating dispersion in a system according to numbered sentence 26A or for lubricating falling shapable masses, which are other than glass gobs, as they fall through an enclosure, optionally wherein:
(i) the lubricating dispersion is a liquid-based lubricating dispersion; and/or
(ii) the lubricating dispersion comprises a solid lubricant has a $d_{90}$ below 150 microns; and/or
(iii) the system comprises a lubricating dispersion which comprises a dispersing agent and/or a rheology modifier.

28A. A method, system or use according to any preceding numbered sentence, further comprising recycling any excess lubricating dispersion.

The invention claimed is:

1. A method comprising:
applying a water based lubricating dispersion including a solid lubricant to a surface of a molten shapable mass,
introducing the molten shapable mass into a shaping system, and
shaping the molten shapable mass,
wherein the molten shapable mass is not a molten glass gob.

2. The method according to claim 1, wherein waste is reduced relative to a second system in which
(A) a lubricant is applied either (i) manually to a part or parts of the second system or (ii) by flame or plasma spraying a molten shapable mass, or
(B) a lubricating composition applied to a molten shapable mass produces carbon black following application to the molten shapable mass and/or during processing of the molten shapable mass into a shaped article.

3. The method according to claim 2, wherein waste is reduced by at least 1%.

4. The method according to claim 1, wherein the lubricating dispersion is applied to the molten shapable mass prior to contact with a part or parts of the system in which the molten shapable mass is processed to form a shaped article.

5. The method according to claim 1, wherein the molten shapable mass is a first molten shapable mass, and wherein the amount of lubricating dispersion applied to the first molten shapable mass is such that
(i) a portion of the solid lubricant transfers from the first molten shapable mass to a surface of the system in which the first molten shapable mass comes into contact, and the portion of the solid lubricant is sufficient for lubricating the surface during at least one subsequent processing cycle of a second molten shapable mass after processing of the first molten shapable mass, or
(ii) a second molten shapable mass processed in the system in a subsequent processing cycle is applied with a lower amount of lubricating dispersion than the amount of lubricating dispersion applied to the first molten shapable mass, or
(iii) no lubricating dispersion is applied to a second molten shapable mass processed in the system in a subsequent processing cycle after processing of the first molten shapable mass.

6. The method according to claim 1, wherein the molten shapable mass is a hot mass having a bulk temperature of at least 200° C.

7. The method according to claim 5, wherein the surface is a surface of a mold for molding the molten shapable mass.

8. The method according to claim 1, wherein the molten shapable mass is in motion as the lubricating dispersion is applied.

9. The method according to claim 1, wherein the molten shapable mass is stationary as the lubricating dispersion is applied.

10. The method according to claim 1, wherein two or more molten shapable masses are processed sequentially in the system, and wherein the lubricating dispersion is applied to no more than every other molten shapable mass in the sequence.

11. The method according to claim 1, wherein two or more molten shapable masses are processed essentially simultaneously in the system.

12. A method comprising:
applying a water-based lubricating dispersion including a solid lubricant to a surface of the molten shapable mass prior to shaping the molten shapable mass,
introducing the molten shapable mass into a shaping system, and
shaping the molten shapable mass,
wherein the lubricant comprises powdered graphite, and
wherein the molten shapable mass is not a molten glass gob.

13. The method of claim 12, wherein the lubricant is transferred from the molten shapable mass to a part of the system requiring lubrication, thereby reducing the amount of lubricant used in the system.

14. The method according to claim 12, wherein the amount of lubricant used is reduced relative to a system in which
(A) a lubricant is applied either (i) manually to a part or parts of the system, or (ii) by flame or plasma spraying a molten shapable mass which is to be processed in the system; or
(B) a lubricating composition applied to a molten shapable mass produces carbon black following application to the molten shapable mass and/or during processing of the molten shapable mass into a shaped article.

15. The method according to claim 12, wherein the lubricating dispersion is applied automatically to a first molten shapable mass followed by a second molten shapable mass, and
the amount of lubricating dispersion applied to the second shapable mass is lower than the amount of lubricating dispersion applied to the first shapable mass.

16. A self-lubricating system configured to implement the method according to claim 15, the system comprising one or more molten shapable masses that act as a carrier for the lubricating dispersion solid, wherein the solid lubricant comprises graphite and has a $d_{90}$ diameter of less than 150 µm.

17. A molten shapable mass having the lubricant dispersion applied to a surface thereof according to the method of claim 1, wherein from about 1% to about 50% of the surface has the lubricant dispersion applied thereto.

18. The method according to claim 1, wherein the lubricating dispersion is applied to the molten shapable mass by spraying or brushing.

19. The method according to claim 1, wherein the lubricating dispersion is applied to the molten shapable mass as the molten shapable mass passes through or is passed through the lubricant dispersion.

20. The method according to claim 1, wherein the lubricating dispersion is applied to the molten shapable mass by dipping or submersing the molten shapable mass in the lubricant dispersion.

21. The method according to claim 1, wherein the solid lubricant is applied by electrostatic discharge on the molten shapable mass as the molten shapable mass passes or is passed through the lubricating dispersion comprising powdered solid lubricant.

22. The method according to claim 1, wherein the solid lubricant has a $d_{90}$ diameter of less than about 150 µm.

23. The method according to claim 1, wherein the lubricating dispersion comprises at least one of a dispersant or a rheology modifier.

24. The method according to claim 1, wherein the molten shapable mass is a ceramic precursor, a metallic precursor, or a polymeric precursor.

25. The method according to claim 1, wherein graphite is the only lubricant in the solid lubricant.

26. The method according to claim 1, wherein the lubricating dispersion applied does not produce carbon black following application to the molten shapable mass and/or during processing of the molten shapable mass into a shaped article.

27. The method according to claim 1, wherein the temperature of the molten shapable mass does not decrease by more than 10° C. upon application of the lubricating dispersion.

* * * * *